Oct. 25, 1960

R. T. ADAMS ET AL 2,957,921

PROCESSES FOR SEPARATING HYDROPEROXIDES
INTO PHENOL AND OTHER PRODUCTS

Filed March 31, 1958

INVENTORS
ROBERT T. ADAMS
JOHN R. B. ELLIS
JAMES A. ROBBERS
BY
ATTORNEYS

United States Patent Office 2,957,921
Patented Oct. 25, 1960

2,957,921
PROCESSES FOR SEPARATING HYDROPEROXIDES INTO PHENOL AND OTHER PRODUCTS

Robert T. Adams, Walnut Creek, John R. B. Ellis, San Rafael, and James A. Robbers, San Pablo, Calif., assignors to California Research Corporation, San Francisco, Calif., a corporation of Delaware Filed Mar. 31, 1958, Ser. No. 725,441
11 Claims. (Cl. 260—621)

This invention relates to α,α-dialkylarylmethyl hydroperoxides, for example α,α-dimethylbenzyl hydroperoxide (cumene hydroperoxide, hereinafter referred to as "CHP"), and more particularly to improvements in processes for conversion of said hydroperoxides by cleavage in the presence of acid into other products including phenol; and an object of the invention is to provide novel methods for improving the quality of said other products.

This application is a continuation-in-part of our co-pending application Serial No. 594,507, filed June 28, 1956, and now abandoned.

Of the various processes for producing phenols synthetically, one that has been found to be particularly useful is an acid-catalyzed cleavage of α,α-aryldialkylmethyl hydroperoxides to produce phenols and ketones. Heretofore considerable difficulty has been experienced in obtaining products of satisfactory quality, including color, from the operation of such a process. Not only may the cleavage vessel product itself be colored, but frequently it contains excessive amounts of color formers or precursors that cause undesirable coloring when the components of the cleavage vessel product later are combined with other materials. For example, when phenol later is combined with chlorine-containing materials, the reaction of the chlorine with the color formers in the phenol frequently results in an undesirable coloring of the resulting products. It is frequently necessary to apply to the phenol various expensive and time-consuming treatment methods to combat the color formers. Additionally, side reactions such as sulfonation and formation of bisphenol and cumylphenol occur to an undesirable extent in the process as conventionally practiced, with a resulting decrease in the yield of phenol and other desired products.

In view of the foregoing, it is an object of this invention to provide methods for increasing the quality of the products resulting from a process comprising the cleavage of CHP in the presence of acid into other products including phenol. It is a further object of this invention to reduce side reactions in such a process, and to provide improved safety methods for use in operating such a process.

In accordance with the present invention, novel methods are provided for increasing the quality of the products resulting from a process for cleaving CHP in the presence of an acid catalyst into other products including phenol, comprising maintaining in a primary cleavage zone a homogeneous body of cleavage reaction mixture consisting predominantly of phenol, acetone and an acid catalyst, continuously introducing into said zone CHP, acetone and a preferably dilute acid catalyst, continuously withdrawing from said zone and passing through a secondary cleavage zone a portion of said cleavage reaction mixture, adjusting the flow rates of streams entering and leaving said primary cleavage zone to maintain in said primary cleavage zone a steady state CHP concentration from about 0.5 to about 5.0 percent by weight, preferably between about 0.75 to 1.0 percent by weight, maintaining the reaction mixture stream passing through said secondary cleavage zone in residence therein until the CHP concentration of said stream has fallen to a low value, preferably below about 0.1% by weight, and thereupon bringing said stream into contact with a neutralizing agent to neutralize the acid catalyst carried by said stream. Further, in accordance with this invention, the steady state weight ratio of the acid to water in the cleavage zone is maintained at from about 0.01 to 0.25, preferably from about 0.03. Preferably the total acid used in the process of the present invention is less than 1.0 weight percent, and more preferably 0.3–0.6 weight percent, based on hydroperoxide fed to the primary cleavage zone, and the acid required for the cleavage in said primary cleavage zone is supplied to said zone in a diluted acid stream having an acid concentration of from about 10 to 50 weight percent. By using a dilute acid stream, the flows of acid and water to said zone are interlocked to provide an interruption of water flow to said zone wherever an interruption in acid flow occurs.

The novel features of the present invention are set forth with particularity in the appended claims. The invention will best be understood, however, and additional objects and advantages thereof will be apparent from the following description of an exemplary process for cleaving CHP into other products including phenol, when read in connection with the accompanying drawings, in which:

Systems for the production of phenol by acid catalyzed CHP cleavage heretofore have been described in the literature, for example, in British Patent 626,095, in Filar and Taves U.S. Patent 2,663,735, and in Adams et al. U.S. Patent 2,737,480. These systems are exemplified by the system which is shown in Fig. 1 and outlined herein for purposes of providing a foundation for describing the present invention.

Figure 1:
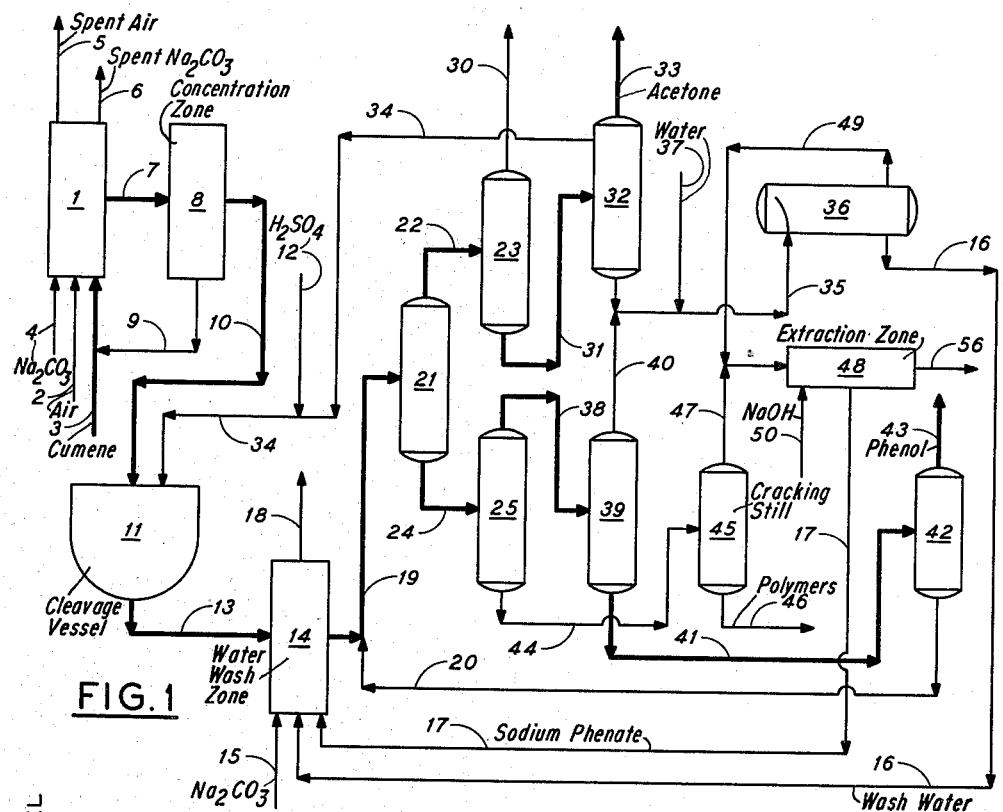
Fig. 1 is a diagrammatic illustration of conventional phenol manufacturing process embodying a conventional cleavage vessel.

Referring now to Fig. 1, air and cumene are introduced into oxidizer 1 through lines 2 and 3, respectively. The air supplies the oxygen for the following reaction in oxidizer 1:

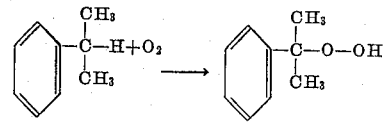

$Na_2CO_3$ is added to oxidizer 1 through line 4 to prevent CHP decomposition in oxidizer 1. Spent air and spent $Na_2CO_3$ are removed through lines 5 and 6, respectively. From oxidizer 1 the CHP passes through line 7 to concentration zone 8, from which cumene is recycled back to oxidizer 1 through line 9. The liquid effluent from concentration zone 8, which may contain, for example, about 90% CHP, is passed through line 10 to cleavage vessel 11. In cleavage vessel 11 the CHP is decomposed in the presence of an acid, supplied to cleavage vessel 11 in a desired concentration. Under conventional practice, for example, 96% $H_2SO_4$, may be introduced into vessel 11 through line 12. The reaction in cleavage vessel 11 proceeds as follows:

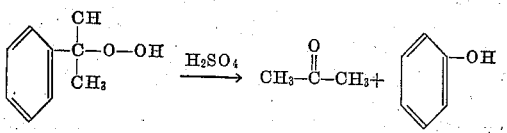

The CHP is substantially completely decomposed under conventional practice and normal operating conditions, by the reaction in cleavage vessel 11. The large exothermic heat of reaction may be removed by refluxing acetone from cleavage vessel 11, for example, in an overhead condensing system (not shown). The effluent from cleavage vessel 11 is carried through line 13 to neutralization and water wash zone 14. Na₂CO₃ is passed through line 15 into zone 14 to neutralize the acid therein. Wash water enters zone 14 through line 16, from another part of the system, and sodium phenate enters zone 14 through line 17 from another part of the system. Spent water and salts are removed from zone 14 through line 18. The effluent from zone 14 is passed through line 19, together with recycle material entering line 19 through line 20, to crude acetone column 21. From acetone column 21 the overhead product is passed through line 22 to acetaldehyde column 23 and the remaining effluent from column 21 is passed through line 24 to crude phenol column 25. From column 23 a product is taken off through line 30 and the remaining effluent is passed through line 31 to pure acetone column 32. From column 32 product acetone is withdrawn through line 33 and a recycle stream is passed through line 34 to cleavage vessel 11. The remaining effluent from column 32 is passed through line 35 to settler 36, along with fresh make-up water introduced through line 37.

Phenol is passed from crude phenol column 25 through line 38 to phenol topping column 39. From column 39 a product is passed to settler 36 through line 40, and the remaining effluent is passed through line 41 to phenol rerun column 42. From column 42 phenol product is taken off through line 43, and a product is recycled through line 20.

Material passing from column 25 through line 44 enters cracking still 45. From still 45, polymers comprising cumyl phenol are withdrawn through line 46 and the remaining products are passed through line 47 to extraction zone 48. Extraction zone 48 is also supplied through line 49 with the nonwater effluent from settling zone 36, and through line 50 with NaOH. From zone 48 sodium phenate is passed through line 17 to neutralization and water wash zone 14, and the remaining product comprising α-methylstyrene, acetophenone, and mesityl oxide is withdrawn through line 56.

The above-described process heretofore has proven very useful in providing aromatic ring substitution without sulfonation or chlorination, and in inherently producing substantial quantities of acetone in addition to the phenol yield. However, as pointed out above, a serious product quality problem heretofore has existed with the process as conventionally practiced.

In conventional practice of the process cleavage generally has been carried out at CHP concentration levels in the cleavage zone not exceeding 0.5 weight percent, for safety reasons and because it has been felt heretofore that more efficient operation thereby resulted. Further, in conventional practice of the process relatively large amounts of acid based on hydroperoxide feed have been used, both to achieve a degree of safety and because they have been considered necessary to accomplish the cleavage reaction satisfactorily. Still further, in conventional practice the steady state weight ratio of acid to water in the cleavage zone generally has been maintained at a relatively high value, without an appreciation of the profound effects obtainable with a lower weight ratio in conjunction with a proper choice of other operating conditions. It has been found, particularly at low acid concentrations in the reaction mixture, that when the CHP concentration in the reaction zone is maintained at from 0.5 to 5.0 weight percent and the steady state weight ratio of acid to water in the reaction zone is maintained at from 0.01 to 0.25, the reactivity of the reaction medium is so controlled that a superior quality product is obtained. The reaction mixture thereby is reacted less violently than in prior art processes with a resulting decrease in side reactions, increase in yield, and improved product quality.

More specifically, it has been found that practice of the process of the present invention can result in a straw-colored cleavage product, in contrast to the very dark-colored product obtained with conventional cleavage processes, and can reduce the mesityl oxide content of the cleavage product by a large factor, which may be 6–10, from the content of the product obtained with conventional cleavage processes. The process of the present invention results in a cleavage product with a markedly reduced content of chlorination color formers or color precursors, so that after chlorination the phenol product as substantially improved quality in that it has substantially reduced chlorination color. Further, the process of the present invention results in reduced side reactions such as sulfonation, and in reduced formation of bisphenol and cumylphenol, and in increased phenol yield. The following table compares operation of a conventional cleavage process with operation of the process of the present invention:

Table

|  | Conventional Cleavage | Cleavage in Accordance with Present Invention |
|---|---|---|
| (a) Feed, Vol. CHP/Vol. Acetone | 2:1 | 2:1. |
| (b) Steady State Sulfuric Acid Concentration in Cleavage Vessel, Wt. Percent. | 0.55 | 0.30. |
| (c) Steady State Water Concentration in Cleavage Vessel, Wt. Percent. | 1.2 | 2.2. |
| (d) Steady State Weight Ratio of Acid to Water in the Cleavage Vessel. | 0.46 | 0.14. |
| (e) Steady State Mesityl Oxide Concentration in Cleavage Vessel, Wt. Percent. | 0.5 | 0.05. |
| (f) Steady State CHP Concentration in Cleavage Vessel, Wt. Percent. | 0.02 | 0.56. |
| (g) Cumylphenol Concentration in Cleavage Vessel, Wt. Percent. | 1.9 | Less than 0.2. |
| (h) Color of Cleavage Product | Dark Red | Straw. |

Figure 2:
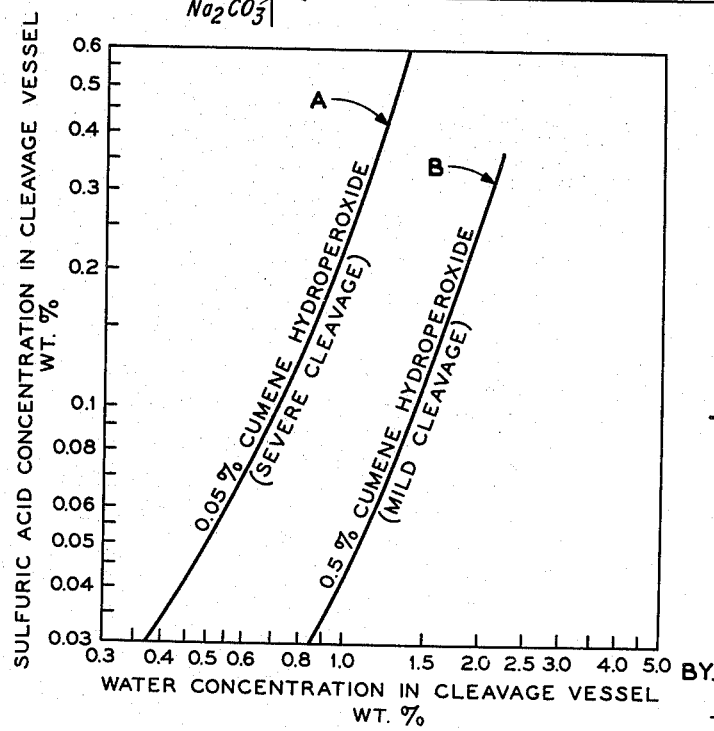
Fig. 2 is a graphical representation of water and acid concentrations in a cleavage zone having separate acid and CHP feeds, for various operating conditions.

Referring now to Fig. 2, there shown is a graphical representation of water and acid concentrations in a cleavage zone being supplied with separate acid and CHP feeds, for a CHP cleavage process conducted under prior art conditions, and for a process conducted according to the present invention, respectively. For convenience the two have been denoted as "severe" cleavage and "mild" cleavage, respectively, to indicate the less violent character of the reaction when the present process is used. The illustration relates to a process wherein the operating conditions and the arrangement of the process equipment were such that residence time of the mixture in a cleavage vessel was about 15 minutes, and the acid in the cleavage vessel effluent was neutralized approximately 45 seconds after the effluent left the cleavage vessel. Under these conditions, curve A is exemplary of the conventional severe cleavage practice, in which substantially all of the CHP is reacted in the cleavage vessel. It was found that under these conditions mild cleavage was obtained by maintaining about 0.5 weight percent CHP in the cleavage vessel mixture and by utilizing the lines between the cleavage vessel and the neutralization zone as a secondary cleavage zone wherein CHP cleavage was allowed to be completed just about the time the mixture reached the neutralization zone. Curve B illustrates possible cleavage vessel acid/water ratios that might have been used for this mild cleavage. It will be noted that mild cleavage operation could have been obtained at any one of a number of points along curve B, i.e., at various ratios of acid to water concentration in the cleavage vessel, i.e., in the primary cleavage zone. However, it was preferable to operate the process high enough up on the curve, for example, at an acid concentration of 0.3 weight percent and a water concentration of 2.2 weight percent (i.e., weight ratio of acid to water of 0.14), to provide sufficient quantities of acid and water for reasonably accurate handling, flow control and measurement.

In addition to the desirability of improved product quality in a cleavage process of the type described, it is desirable that such a process be operated in as safe a manner as possible. The process involves a very large exothermic heat of reaction in the primary cleavage vessel or zone, which under normal operating conditions may be carried away by suitable heat exchange media, for example, an overhead condensing system through which acetone is refluxed from the primary cleavage zone. In the severe cleavage conventionally practiced, the operating conditions are adjusted so that in normal operation the rate of reaction in a cleavage vessel is sufficiently rapid to maintain the CHP concentration in the cleavage vessel at a very low level, for example, 0.01 to 0.1 weight percent, i.e., the cleavage of the CHP is substantially completed in a single cleavage zone or vesesl. In the mild cleavage method presented herein, the CHP concentration in a primary cleavage zone or vessel is maintained at a higher level, in a range from 0.5 to 5.0 weight percent, and preferably from about 0.75 to 1.0 weight percent. Still more preferably, the CHP concentration should be maintained at from about 0.75 to 0.85 weight percent, especially since under certain operating conditions more potential operating danger exists with higher concentrations. In either the severe or mild cleavage situation, the operation of a CHP cleavage process involves a great potential danger of runaway heats of reaction in the initial cleavage zone due to various changes in operating conditions. The rate of heat release from the reaction in the initial cleavage zone, under normal conditions with a low hydroperoxide concentration, is governed by the rate at which the hydroperoxide is being added to the reaction mixture. However, various operating condition changes may cause the initial cleavage zone hydroperoxide concentration to rise to the point where the rate of heat release no longer is governed by the rate at which the hydroperoxide is being added, but is governed by other, largely uncontrollable, factors. Any change in the operating conditions which tends to effect a hydroperoxide concentration build-up in a cleavage zone creates a potential hazard which can become dangerous if an attempt is made to correct operating conditions after an appreciable rise in the hydroperoxide concentration. Among the various operating conditions that may change to cause the hydroperoxide concentration in a primary cleavage zone to rise are: (1) decreased acid flow to the cleavage zone, which may be caused by pump failure and by leaks and stoppages in acid lines; (2) increased water flow rate to the cleavage zone, which may be caused by changes in water content of recycle acetone, cooling water leaks from heat exchangers and water brought in with the concentrated hydroperoxide; (3) neutralization of acid in the cleavage zone, which may be caused by increased carbonate carry-over from the oxidation zone and by backflows into the cleavage zone. Under normal operating conditions the major portion of the reaction is carried out in the presence of sufficiently small amounts of water (which decelerates the rate of reaction) and sufficiently large amounts of acid (which accelerates the rate of reaction) to make the hydroperoxide decomposition fairly complete. Under such conditions the usual heat exchange media have sufficient capacity for carrying away the hydroperoxide heat of decomposition and the acid heat of solution. However, rises in the concentration of hydroperoxide in a cleavage zone caused by any of the above-discussed changes in operating conditions, for example, failure of acid flow to the cleavage zone for a time, will result in the reaction of above-normal quantities of hydroperoxide when the normal operating conditions, for example, resumption of normal acid flow, are restored. In such case, if the heat exchange media does not have the capacity to continuously carry off the abnormal heat of hydroperoxide decomposition and heat of acid solution, the temperature rise in the cleavage zone will cause the reaction to speed up, thus producing heat at a greater rate, and so on in a cumulative or cascading fashion. The temperatures and pressures in the cleavage zone thus very quickly can become uncontrollable, because of the extreme speed of the reaction and the enormous amounts of heat involved. The potential hazard to personnel and equipment from such runaway temperatures and pressures is apparent. Methods for increasing safety, in view of the potential hazard, will now be presented and discussed in connection with Fig. 3.

Figure 3:
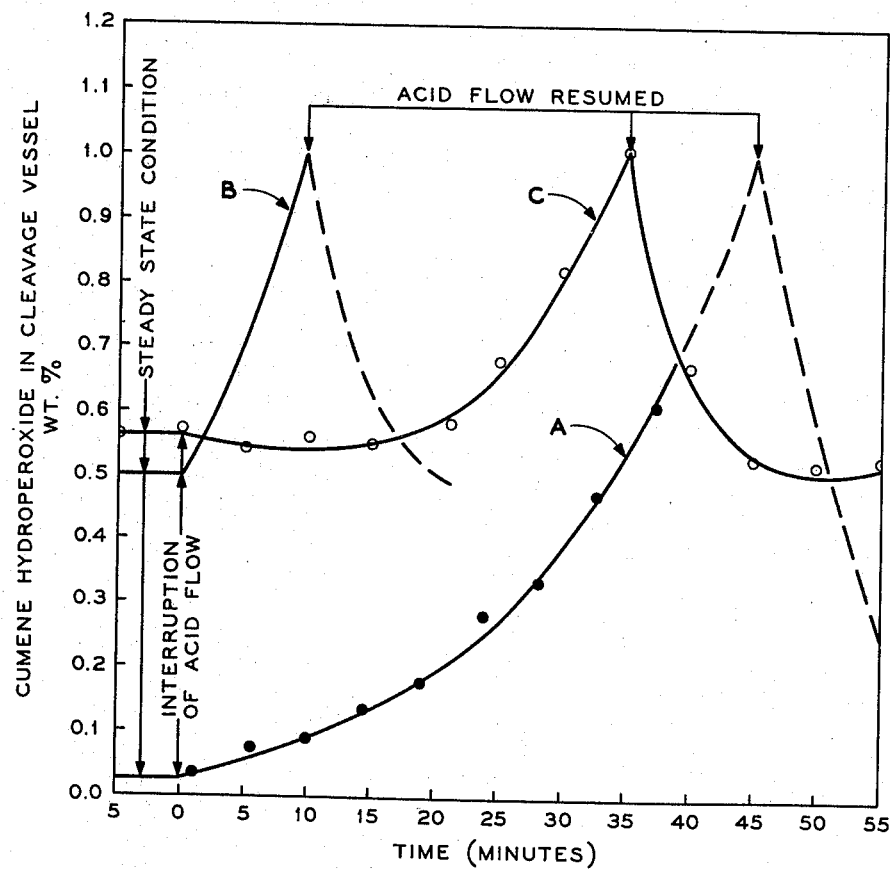
Fig. 3 is a graphical representation of CHP concentration versus time in a cleavage zone having separate acid and CHP feeds, as related to failure of acid flow to said zone.

Referring now to Fig. 3, there shown is a graphical representation of CHP concentration versus time in a primary cleavage zone or vessel having separate acid and CHP feeds, as related to failure and resumption of acid flow to said zone. All curves relate to a process operated with 15 minutes cleavage vessel residence time and with a feed to the cleavage vessel comprising 2 volumes of CHP per volume of acetone. Curve A represents a conventional severe cleavage operation in a process in which the acid feed was supplied to a cleavage vessel, serving as a single cleavage zone, in a concentration of about 100%, and in which there were steady state concentrations in the cleavage vessel of 0.55 weight percent sulfuric acid and 1.2 weight percent water (i.e., weight ratio of acid to water of 0.46). Curve B represents a cleavage operation in a process in which the acid feed was supplied to a cleavage vessel, serving as a primary cleavage zone, in a concentration of about 100%, and in which there were steady state concentrations in the cleavage vessel of 0.31 weight percent sulfuric acid and 2.5 weight percent water (i.e., weight ratio of acid to water of 0.12). Curve C represents a mild cleavage operation in a process in which the acid feed was supplied to a cleavage vessel, serving as a primary cleavage zone, in a concentration of about 20 weight percent, and in which there were steady state concentrations in the cleavage vessel of 0.3 weight percent sulfuric acid and 2.2 weight percent water (i.e., weight ratio of acid to water of 0.14). Curves A and B indicate rapid rises to 1.0 weight percent CHP in the cleavage vessel upon a failure of acid flow to the cleavage vessel, where 1.0 is a figure arbitrarily selected from a safety standpoint as a concentration that it should not be possible for a process to exceed in the interval between periodic checks of the CHP cleavage vessel concentration. Those skilled in the art will appreciate that because the 1.0 figure is arbitrarily selected, the figure could be raised, for example, by lengthening the interval between said periodic checks and thus accepting a smaller safety factor. However, for any given process and set of operating conditions, those skilled in the art will realize that CHP concentrations above about 5.0% should be considered inoperative as involving too slight a safety factor. When the concentrated acid feed is resumed at 1.0% cumene hydroperoxide concentration, or at any other concentration, there will be a precipitous drop in CHP concentration down to the original concentration, as shown, with a resulting and potentially extremely dangerous rise in heat release and pressure within the cleavage vessel. However, as may be seen from curve C, upon acid failure in the mild cleavage case with dilute acid feed, there was a slight decrease in cumene hydroperoxide concentration at first, and then a rise until dilute acid flow was resumed. It was noted that upon resumption of acid flow the hydroperoxide concentration decreased smoothly to the original concentration without surging. From the foregoing it may be seen that from a safety standpoint it is desirable to operate the cleavage with the dilute acid feed disclosed herein. From the curves in Fig. 2, it may be seen that a decrease in acid concentration in a cleavage vessel without a decrease in water concentration will cause the CHP concentration to rise more rapidly than with an accompanying decrease in water concentration. Therefore, it is a distinct safety advantage of the methods of this invention that upon an interruption of acid to a cleavage vessel, the water flow to that vessel will also be interrupted. By providing a dilute acid feed, the acid and water feeds to the vessel in effect are interlocked so that one cannot fail unless the other fails also.

The process of the present invention uses steady state weight ratios of acid to water less than 0.25, and steady state CHP concentrations from 0.5 to 5.0 weight percent in a main cleavage zone. Preferably, less than about 1.0 weight percent of acid, based on hydroperoxide fed, is used. Operating in this manner permits the quantity and yield benefits referred to above, but raises the problem of how to carry out the reaction safely. Prior art processes achieve a measure of safety by using large excesses of acid, but with undesirable side reactions, poorer yields, and poorer product quality resulting from overreacting the mixture. In the present process the undesirable results are avoided by reacting the mixture less violently, and the reaction may be carried out safely by interlocking the flow of acid and water to the cleavage zone, preferably by using a dilute acid feed. A surprising effect is that if acid flow is lost inadvertently, the cleavage actually continues at an undiminished and actually increased rate for a time before falling off. Thus, a greater time is available for taking corrective action.

From the foregoing it may be seen that the novel methods of the present invention are effective in improving product quality, yields and safety, in processes for cleaving cumene hydroperoxide in the presence of acid into other products including phenol.

Although only specific arrangements and modes of operation of the present invention have been described and illustrated, numerous changes could be made in those arrangements and modes without departing from the spirit of this invention, and all such changes that fall within the scope of the appended claims are intended to be embraced thereby. Although sulfuric acid is preferred, the present invention comprehends the use of other acids, for example HCl, $H_3PO_4$ and HF.

What is claimed is:

1. In a continuous process for cleaving cumene hydroperoxide in the presence of acid into other products including phenol, the improvement which comprises accomplishing a major proportion of said cleavage in a cleavage zone containing a homogeneous reaction mixture, maintaining the steady state concentration of cumene hydroperoxide in said reaction mixture at from about 0.5 to 5.0 weight percent, maintaining the steady state weight ratio of acid to water in said cleavage zone at from about .01 to .25, withdrawing an effluent from said cleavage zone, completing the cleavage of cumene hydroperoxide in said effluent, and recovering phenol as a product from said effluent.

2. A process as in claim 1, wherein said effluent is of such composition that the cumene hydroperoxide therein will become substantially cleaved without further acid addition when said effluent is held in a residence zone, and wherein said effluent is passed through a residence zone and maintained in said zone until said cumene hydroperoxide has become substantially completely cleaved, and wherein the acid in said effluent is neutralized substantially immediately upon completion of the cleavage of the cumene hydroperoxide in said effluent, and wherein said phenol is recovered as a product from said effluent after said neutralization.

3. A process as in claim 1, wherein said acid is sulfuric acid.

4. In a continuous process for cleaving cumene hydroperoxide in a homogeneous system in the presence of acid into other products including phenol, the improvement which comprises continuously supplying cumene hydroperoxide and dilute acid to a cleavage zone, maintaining the concentration of cumene hydroperoxide in said cleavage zone at from about 0.5 to 5.0 weight percent, maintaining the weight ratio of acid to water in said cleavage zone at from about .01 to .25, maintaining the amount of acid used as a percent of cumene hydroperoxide fed to said cleavage zone below about 1.0, withdrawing an effluent mixture containing phenol and cumene hydroperoxide from said cleavage zone, completing the cleavage of cumene hydroperoxide in said effluent, and recovering phenol as a product from said effluent.

5. A process as in claim 4, wherein said dilute acid being supplied to said cleavage zone has a concentration from about 10 to about 50 percent.

6. A process as in claim 4, with the additional steps, prior to said phenol recovery, of passing said effluent mixture from said cleavage zone to a secondary cleavage zone, completing in said secondary cleavage zone the cleavage of residual cumene hydroperoxide in said mixture without further acid addition, and neutralizing the acid in said mixture substantially immediately upon said cleavage completion.

7. A process as in claim 4, wherein said acid is sulfuric acid.

8. In a continuous process for cleaving cumene hydroperoxide in a homogeneous system in the presence of acid into other products including phenol, the improvement comprising the steps of supplying to a cleavage zone cumene hydroperoxide, acid and water, said acid being 10 to 50 weight percent of said acid plus said water, maintaining a steady state cumene hydroperoxide concentration in said cleavage zone of from about 0.5 to 5.0 weight percent, maintaining a steady state weight ratio of acid to water in said cleavage zone of from about 0.01 to 0.25, withdrawing an effluent mixture containing phenol and cumene hydroperoxide from said cleavage zone, completing the cleavage of cumene hydroperoxide in said effluent, and recovering phenol as a product from said effluent.

9. A process as in claim 8, wherein said acid and water are supplied to said cleavage zone as a dilute acid stream.

10. A process as in claim 8, with the additional step, prior to recovering said phenol from said mixture, of passing said mixture through a secondary cleavage zone, maintaining said mixture in said secondary cleavage zone without further acid additional until substantial completion of the cleavage of residual cumene hydroperoxide in said mixture, and neutralizing the acid in said mixture substantially immediately upon said cleavage completion.

11. In a continuous process for producing phenol and acetone by acid catalyzed cleavage of cumene hydroperoxide, the improved method comprising maintaining in a primary cleavage zone a substantially homogeneous body of cleavage reaction mixture consisting predominantly of phenol, acetone, water and an acid catalyst, continuously introducing into said zone cumene hydroperoxide, acetone, water and acid, said acid being supplied to said zone in amounts below about 1.0 percent of said cumene hydroperoxide being supplied to said zone, maintaining the steady state cumene hydroperoxide concentration in said zone at from about 0.5 to 5.0 weight percent, maintaining the steady state weight ratio of acid to water in said zone at from about 0.01 to 0.25, continuously withdrawing from said zone and passing through a secondary cleavage zone reaction mixture from said primary cleavage zone, maintaining said reaction mixture passing through said secondary residence zone in residence therein until the cumene hydroperoxide concentration in said reaction mixture has fallen below about 0.1 percent by weight, thereupon bringing said reaction mixture into contact with a neutralizing agent to neutralize acid in said reaction mixture, and recovering phenol as a product from said reaction mixture.

References Cited in the file of this patent

UNITED STATES PATENTS

| 2,663,735 | Filar | Dec. 22, 1953 |

FOREIGN PATENTS

| 629,429 | Great Britain | Sept. 20, 1949 |
| 689,734 | Great Britain | Apr. 1, 1953 |